US010358227B2

(12) United States Patent
Gruner et al.

(10) Patent No.: US 10,358,227 B2
(45) Date of Patent: Jul. 23, 2019

(54) SIDELOAD REACTION BEARING

(71) Applicant: The Boeing Company, Chicago, IL (US)

(72) Inventors: Bryan J. Gruner, Bellevue, WA (US); Gary A. Bond, Kent, WA (US); Tom M. Balut, Renton, WA (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 15/677,200

(22) Filed: Aug. 15, 2017

(65) Prior Publication Data

US 2019/0055025 A1 Feb. 21, 2019

(51) Int. Cl.
| | |
|---|---|
| *B64D 27/26* | (2006.01) |
| *F01D 25/28* | (2006.01) |
| *F16C 35/00* | (2006.01) |
| *F01D 25/16* | (2006.01) |
| *F02C 7/20* | (2006.01) |
| *F16C 11/04* | (2006.01) |
| *F16C 11/10* | (2006.01) |
| *F16C 29/02* | (2006.01) |
| *F16C 33/22* | (2006.01) |

(52) U.S. Cl.
CPC ............ *B64D 27/26* (2013.01); *F01D 25/16* (2013.01); *F01D 25/28* (2013.01); *F02C 7/20* (2013.01); *F16C 11/04* (2013.01); *F16C 11/10* (2013.01); *F16C 29/02* (2013.01); *F16C 33/22* (2013.01); *F16C 35/00* (2013.01); *B64D 2027/262* (2013.01); *B64D 2027/268* (2013.01); *F01D 25/162* (2013.01); *F16C 2326/43* (2013.01)

(58) Field of Classification Search
CPC ... B64D 27/26; B64D 2027/262; F01D 25/28; F01D 25/162
USPC ......................................................... 248/662
See application file for complete search history.

(56) References Cited

U.S. PATENT DOCUMENTS

| | | | |
|---|---|---|---|
| 3,006,587 A | 10/1961 | Jumelle et al. | |
| 3,155,352 A * | 11/1964 | Batt | F02C 7/32 248/662 |
| 3,979,087 A | 9/1976 | Boris et al. | |
| 5,474,258 A | 12/1995 | Taylor et al. | |
| 8,322,651 B2 * | 12/2012 | Levert | B64C 27/26 244/53 R |
| 9,180,975 B2 * | 11/2015 | Brochard | F16F 1/50 |
| 9,676,489 B2 * | 6/2017 | Serra | B64D 27/26 |
| 9,828,103 B2 * | 11/2017 | Cassagne | B64D 27/26 |
| 10,006,373 B2 * | 6/2018 | Jiang | F02C 7/32 |

(Continued)

FOREIGN PATENT DOCUMENTS

WO 9311041 6/1993

OTHER PUBLICATIONS

European Search Report Application No. 18180955 dated Dec. 10, 2018.

*Primary Examiner* — Bradley Duckworth
(74) *Attorney, Agent, or Firm* — Perman & Green, LLP

(57) ABSTRACT

An interface apparatus including a load bearing member configured for coupling to a structure, and an attachment member coupled to the load bearing member, wherein the load bearing member is configured to react loads, from the attachment member to the structure, in at least a first direction while simultaneously providing free movement of the attachment member in at least a second direction.

20 Claims, 15 Drawing Sheets

(56) References Cited

U.S. PATENT DOCUMENTS

| | | | |
|---|---|---|---|
| 10,029,801 B2* | 7/2018 | Butcher | B64D 27/12 |
| 10,066,552 B2* | 9/2018 | Jiang | F02C 7/32 |
| 2011/0064343 A1 | 3/2011 | Larrochelle et al. | |
| 2013/0200211 A1 | 8/2013 | Zheng et al. | |
| 2017/0050739 A1* | 2/2017 | Jon | B64D 41/00 |
| 2018/0127105 A1* | 5/2018 | Orteu | B64D 27/26 |
| 2018/0237147 A1* | 8/2018 | Suciu | B64D 27/26 |
| 2018/0327102 A1* | 11/2018 | Couffignal | B64D 27/26 |

* cited by examiner

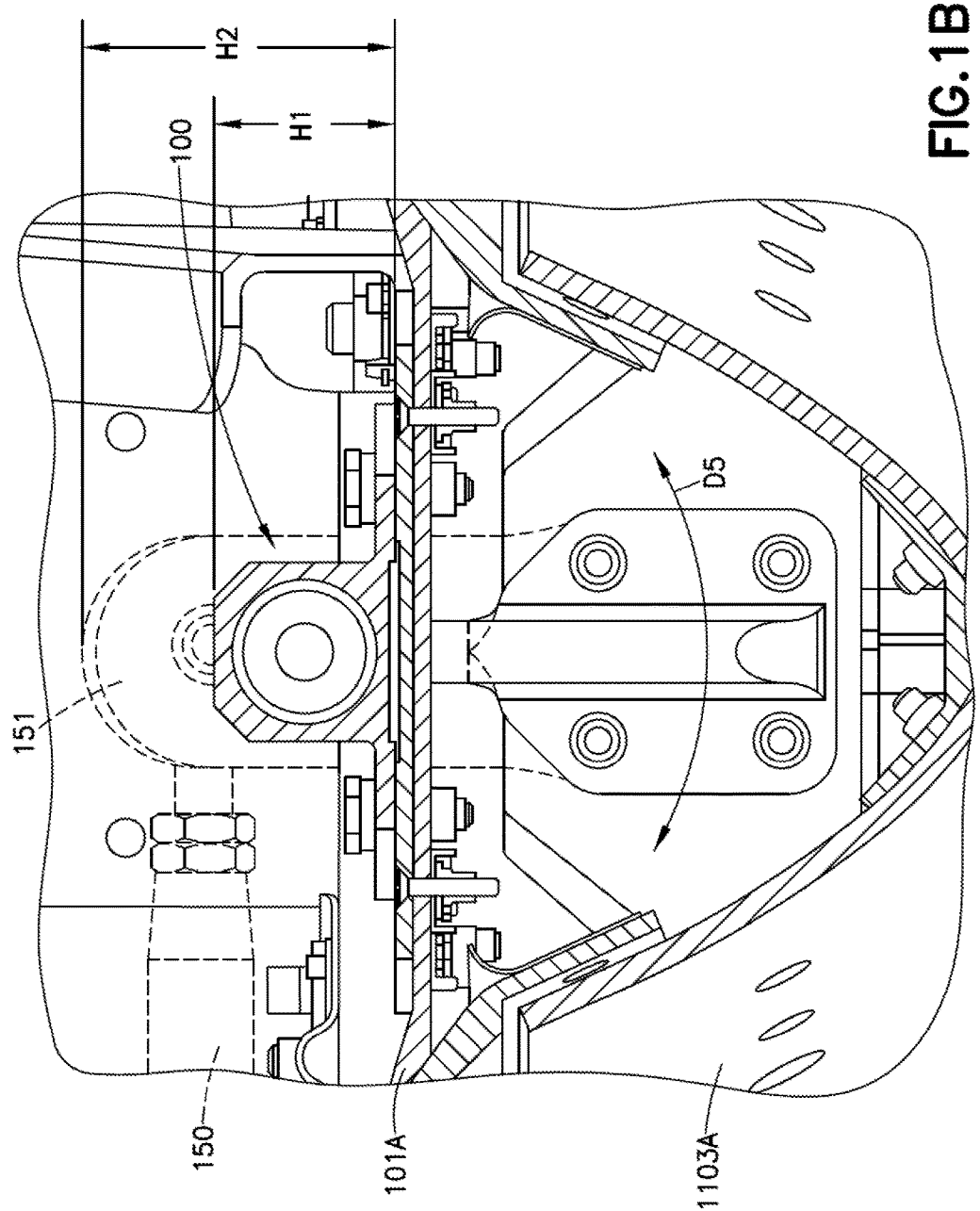

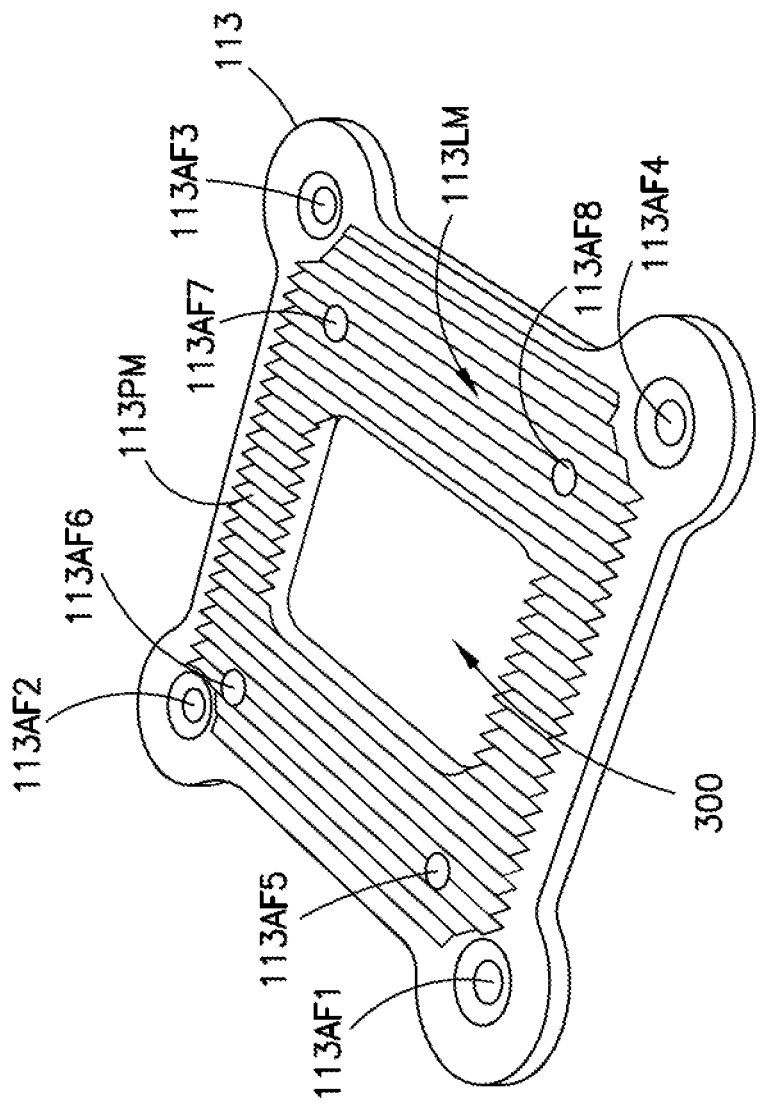

SIDELOAD REACTION BEARING

BACKGROUND

1. Field

The exemplary embodiments generally relate to couplings and in particular to couplings that provide one or more degrees of freedom of movement while reacting loads in one or more directions.

2. Brief Description of Related Developments

Interfaces between engine strut fairings and wings of an aircraft traditionally use tie-rods fitted on a rib/spar of the wing to provide inboard and outboard support for the engine strut fairing. The tie-rods are generally long and require fittings for coupling the tie-rods to the rib/spar and the engine strut fairing. The use of tie-rods and the associated fittings increases part count for the aircraft, cost for the production of the aircraft, and weight of the aircraft.

The process of installing the tie-rods involves installing a support fitting on the rib/spar of the wing and a fairing fitting where the engine strut fairing interfaces with the wing. After installing the fittings, the tie-rod is installed extending from the support fitting to the fairing fitting. In some instances, located between each fitting is a seal bulkhead through which the tie-rod must penetrate. Penetrating the seal bulkhead prevents a continuous seal from being formed.

A vapor barrier is also provided at the penetration of the fairing fitting through the skin of the wing. This again increases part count and cost of the aircraft.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an interface apparatus including a load bearing member configured for coupling to a structure, and an attachment member coupled to the load bearing member, wherein the load bearing member is configured to react loads, from the attachment member to the structure, in at least a first direction while simultaneously providing free movement of the attachment member in at least a second direction.

Another example of the subject matter according to the present disclosure relates to an interface apparatus including a bearing housing configured for coupling to a structure, and a bearing having an attachment member coupled thereto, wherein the bearing housing is configured to house the bearing so as to constrain the bearing in at least a first direction and to provide free movement of the bearing in at least a second direction, wherein the bearing housing, housing the bearing, is configured to react loads, from the attachment member to the structure, in at least the first direction while simultaneously providing free movement of the attachment member in at least the second direction.

Still another example of the subject matter according to the present disclosure relates to a method including reacting loads, from an attachment member to a structure, in at least a first direction with a load bearing member coupled to the structure where the attachment member is coupled to the load bearing member, and simultaneously providing free movement of the attachment member, with the load bearing member, in at least a second direction.

BRIEF DESCRIPTION OF THE DRAWINGS

Figure 1A:
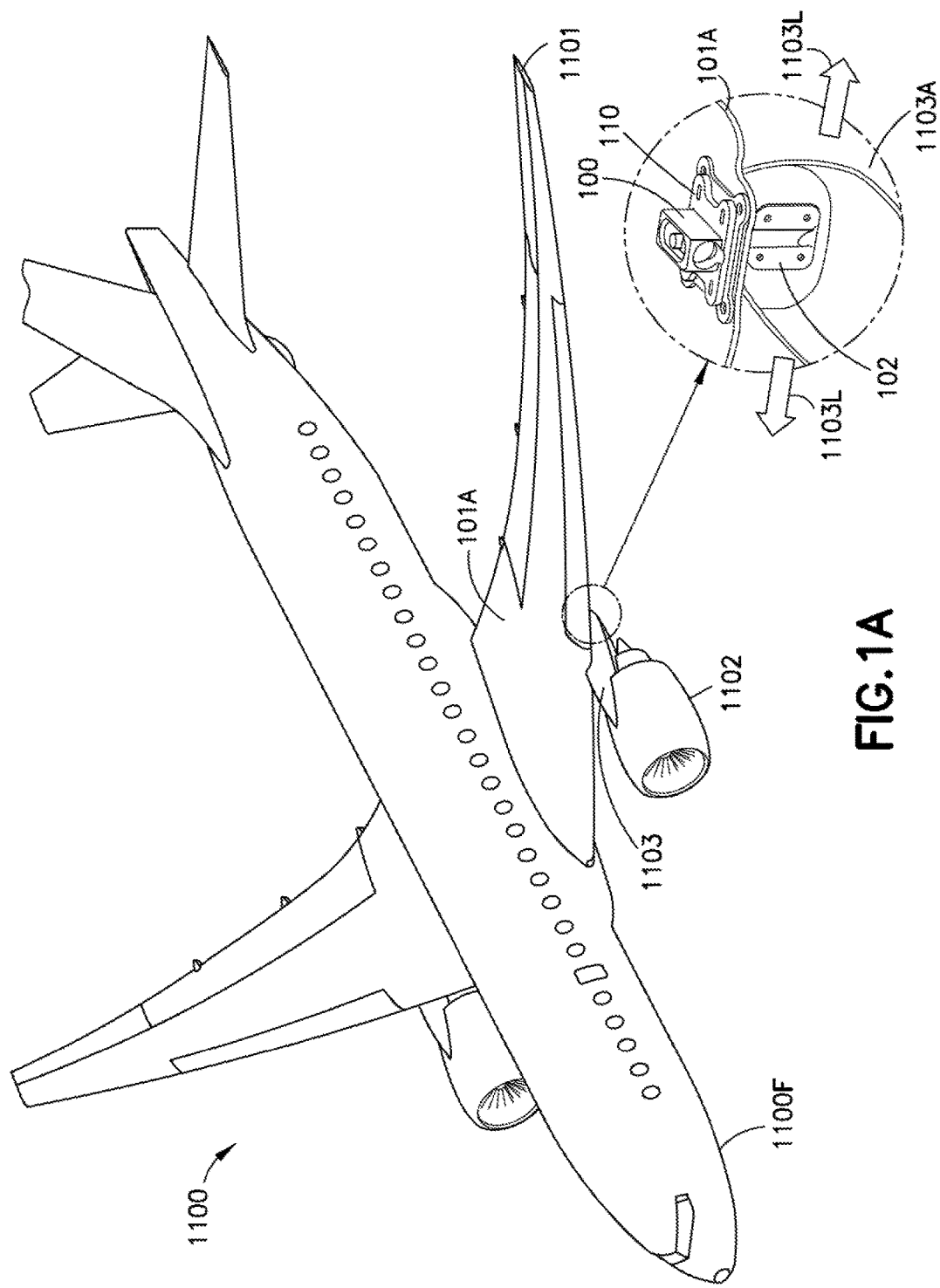
Figure 1C:
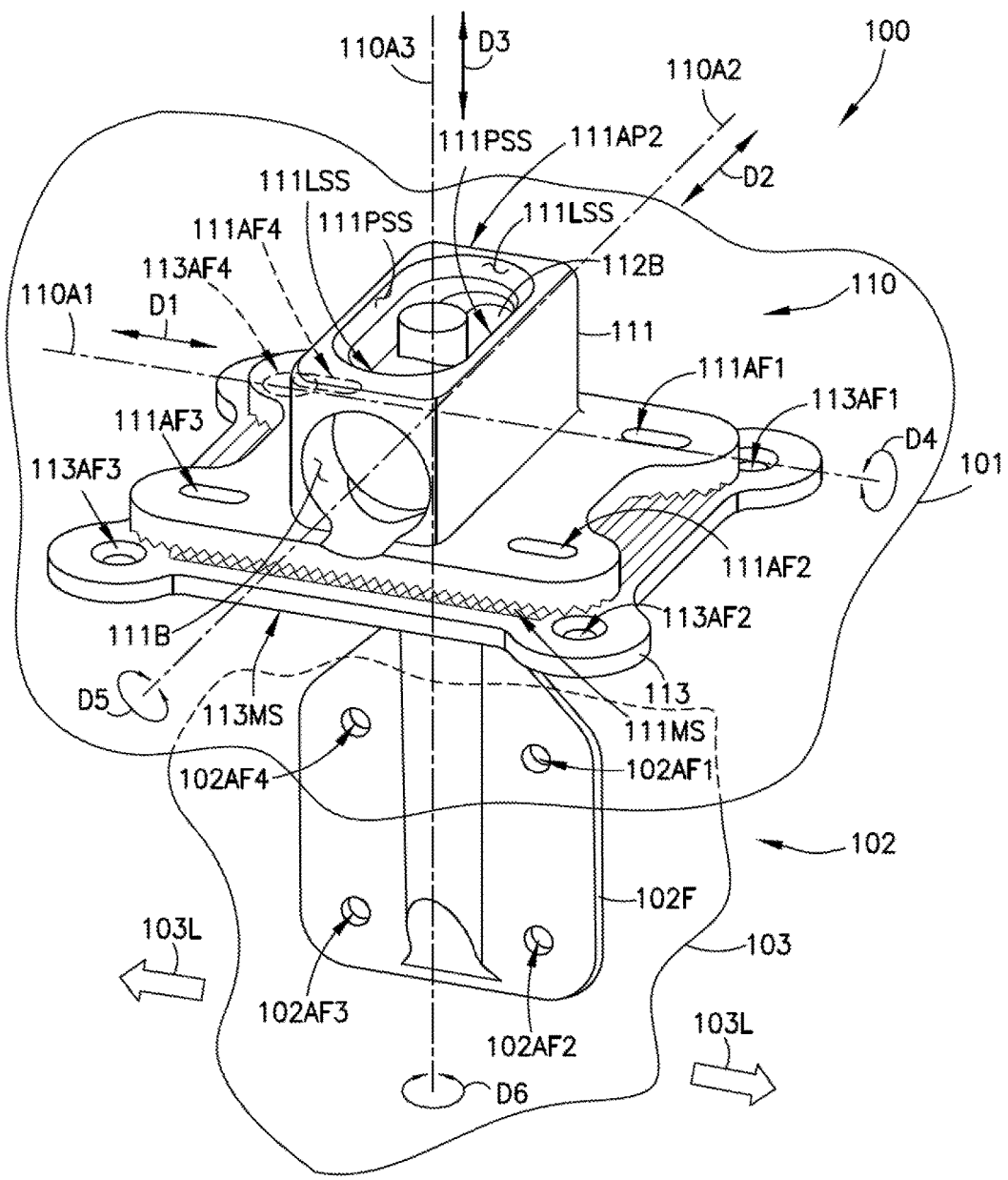
Figure 2A:
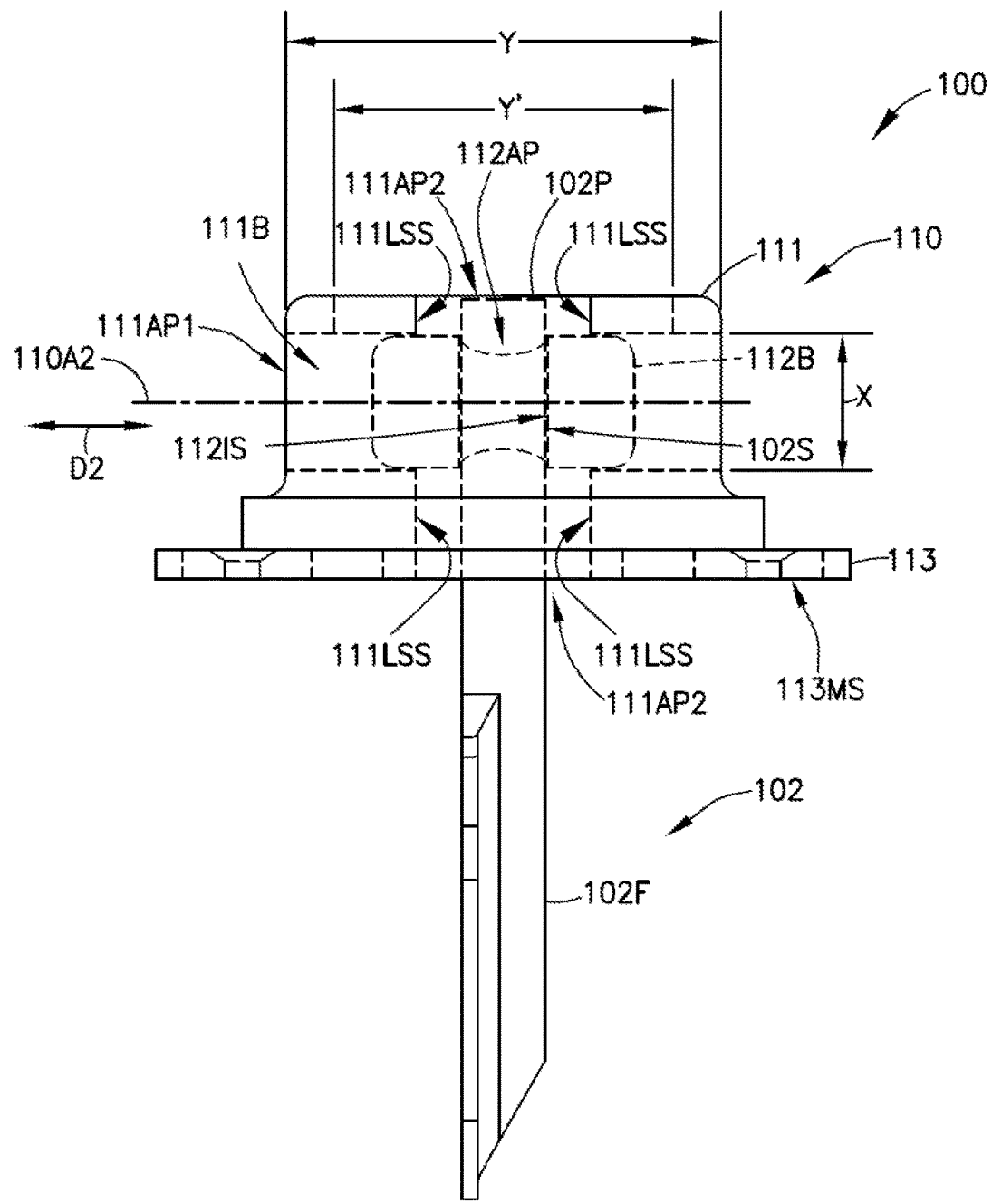
Figure 2B:
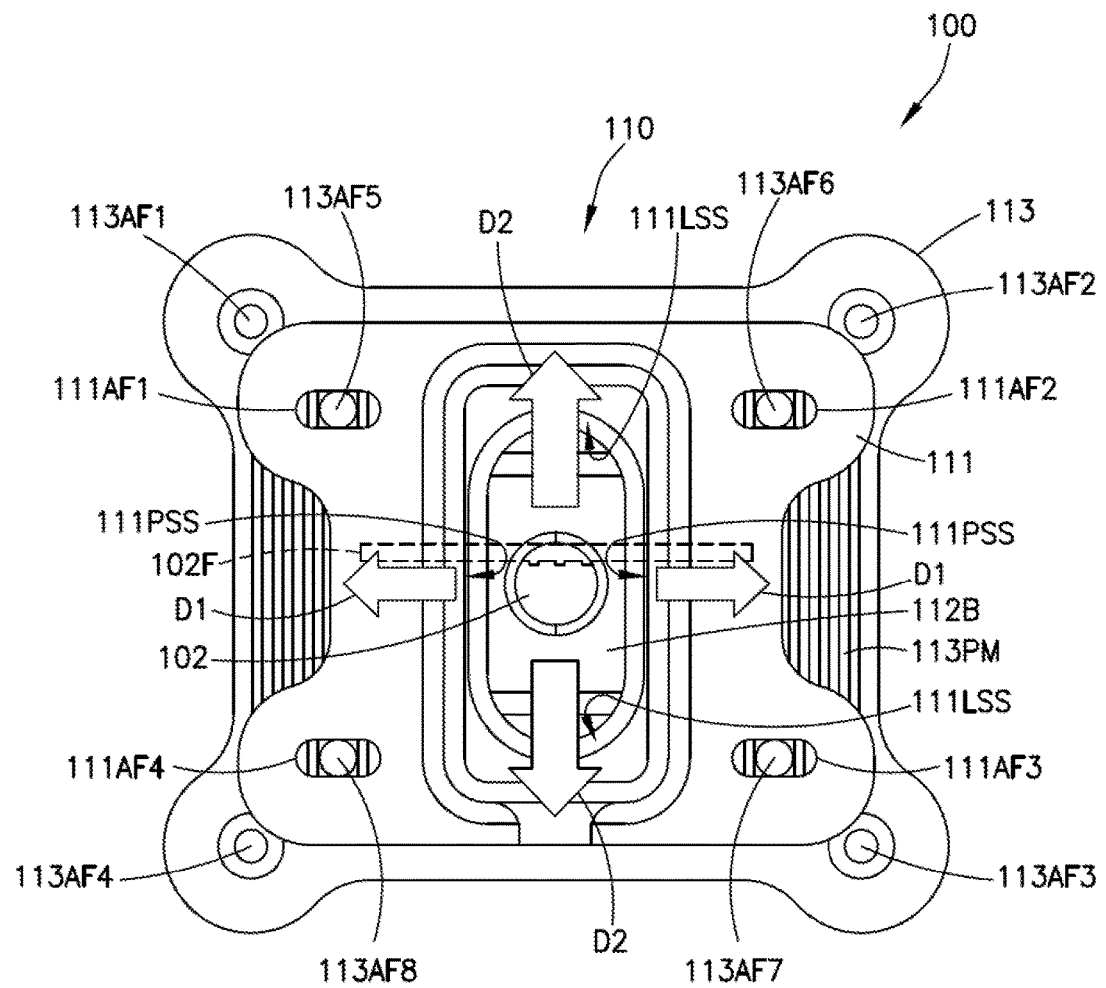
Figure 4A:
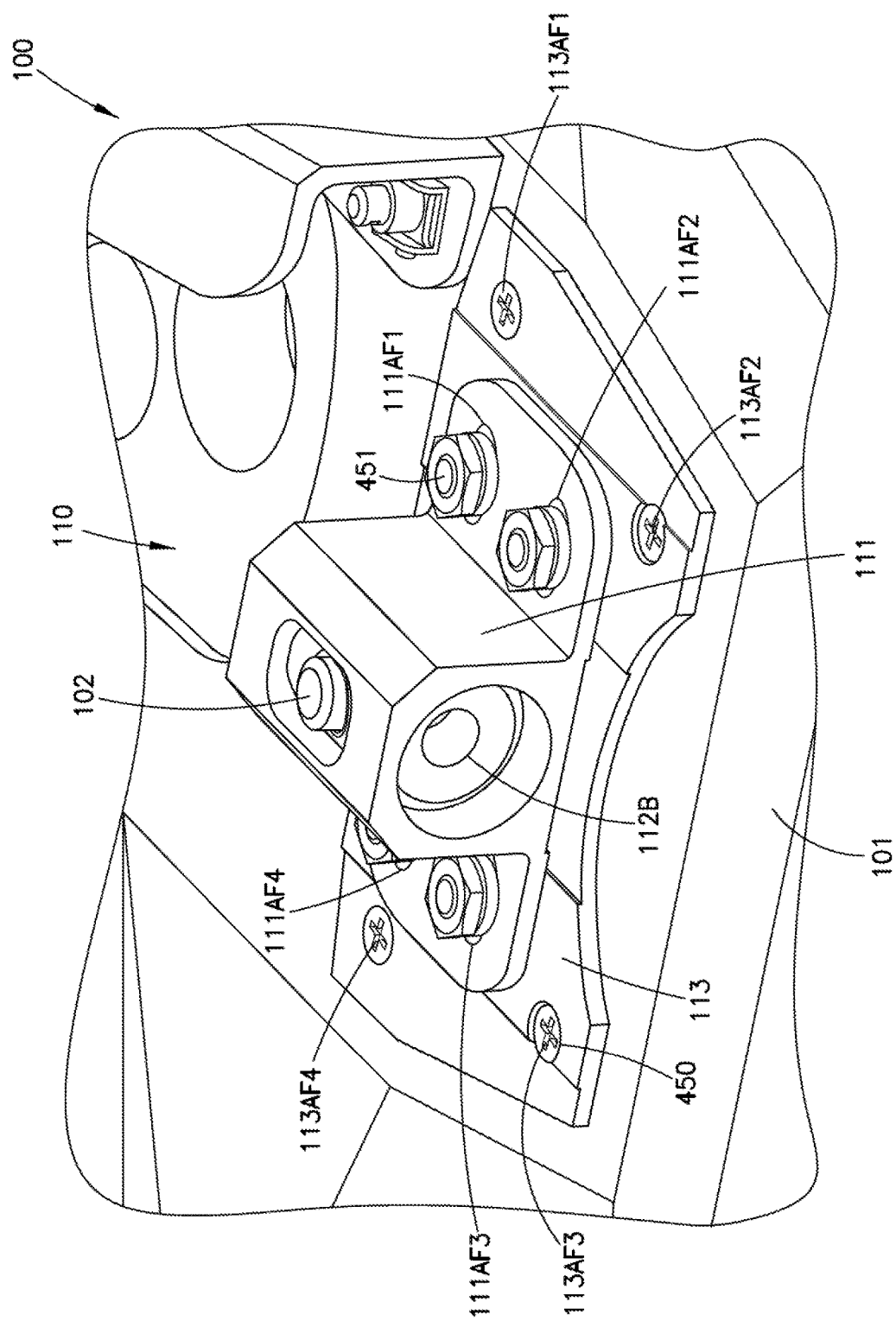
Figure 4B:
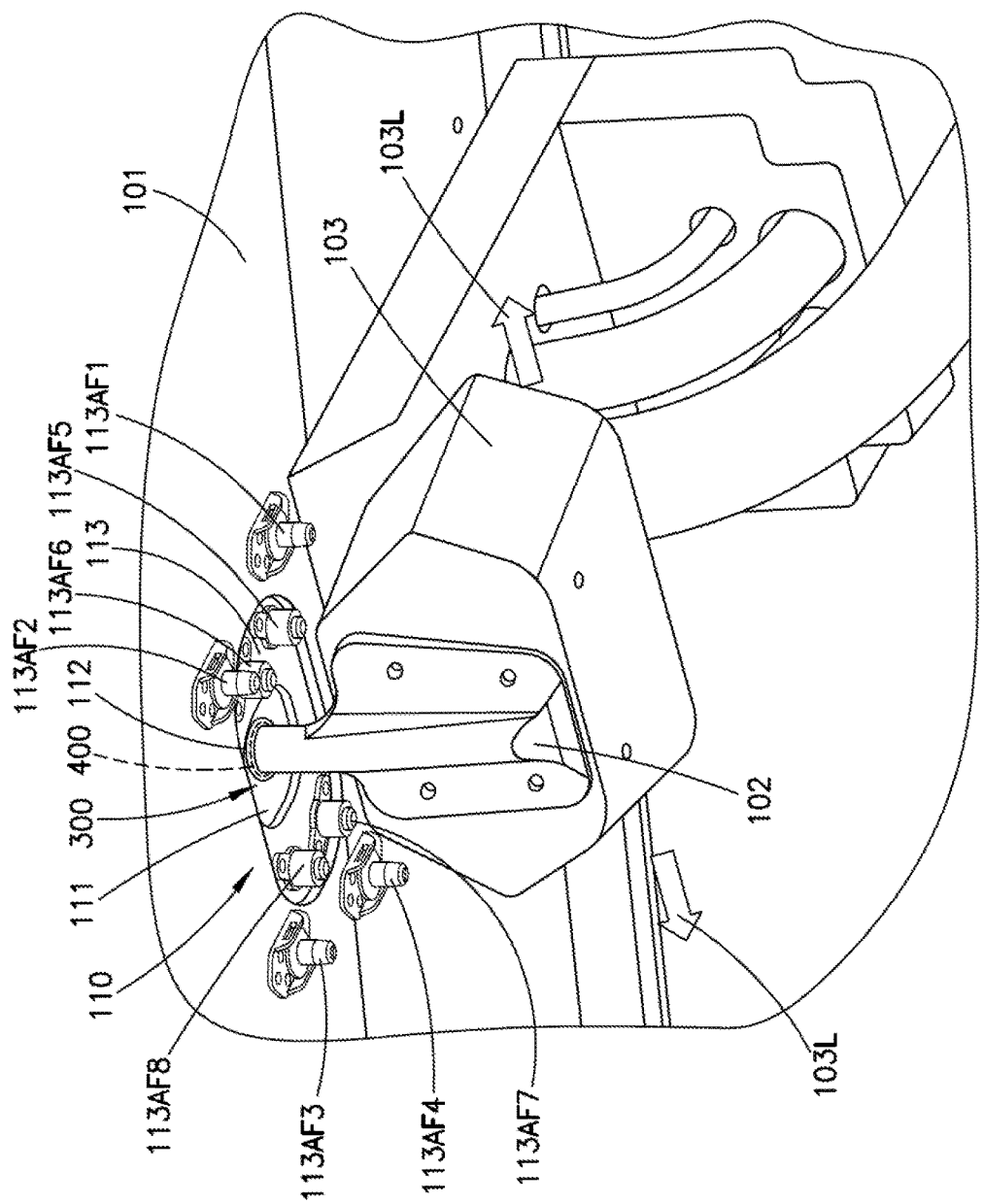
Figure 6B:
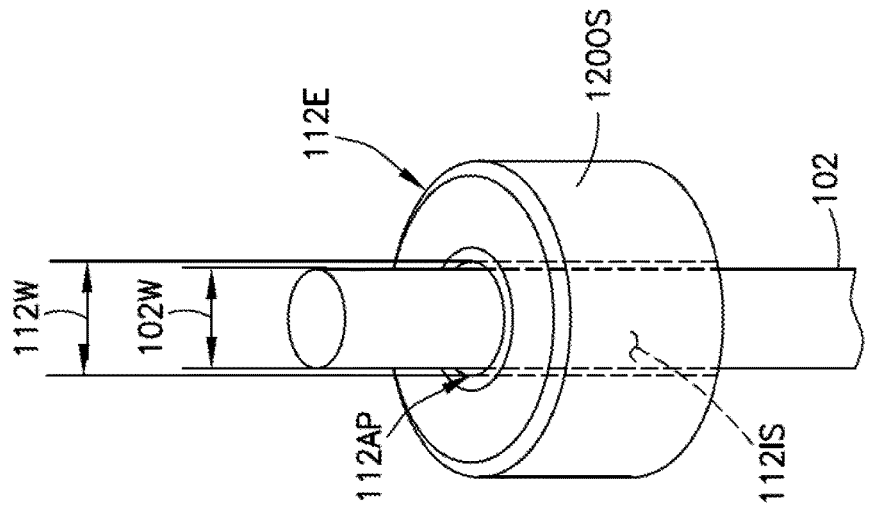
Figure 5:
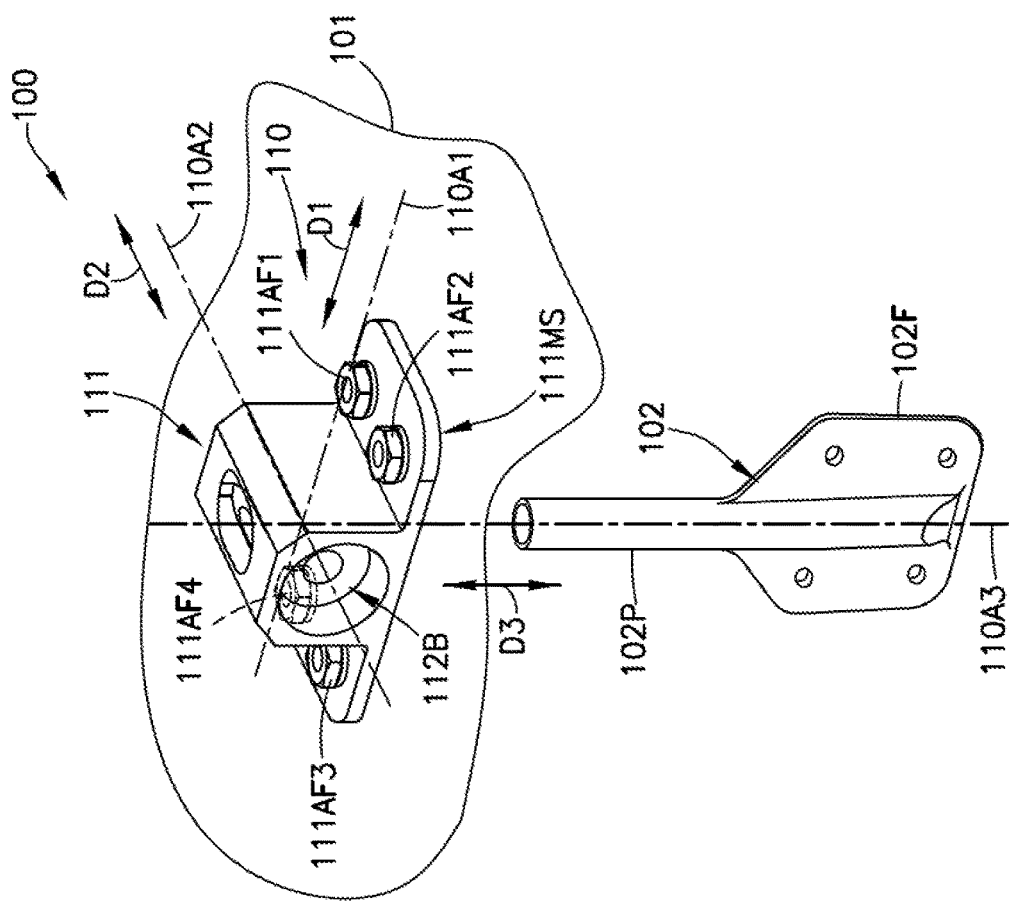
Figure 6A:
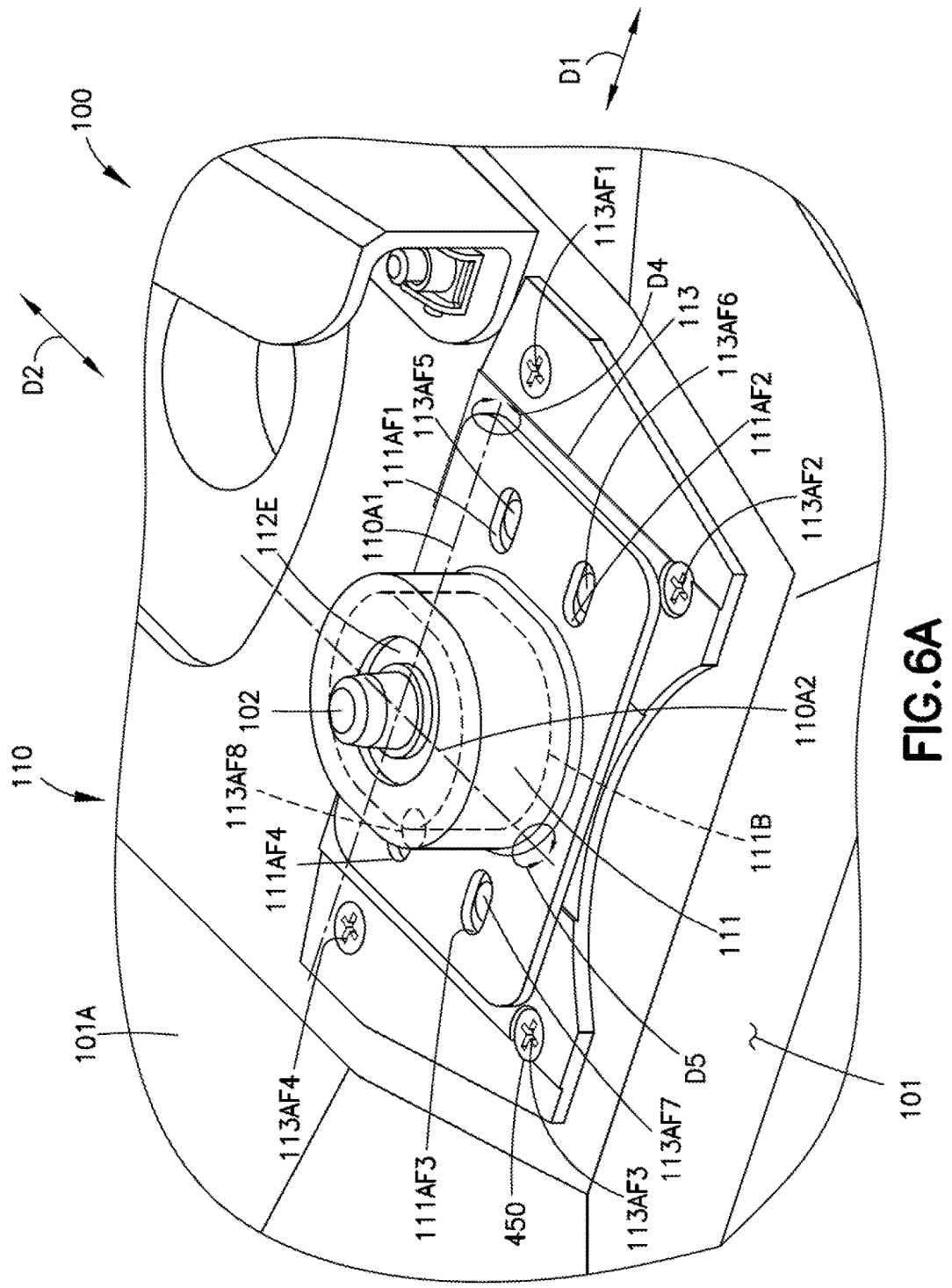
Figure 7:
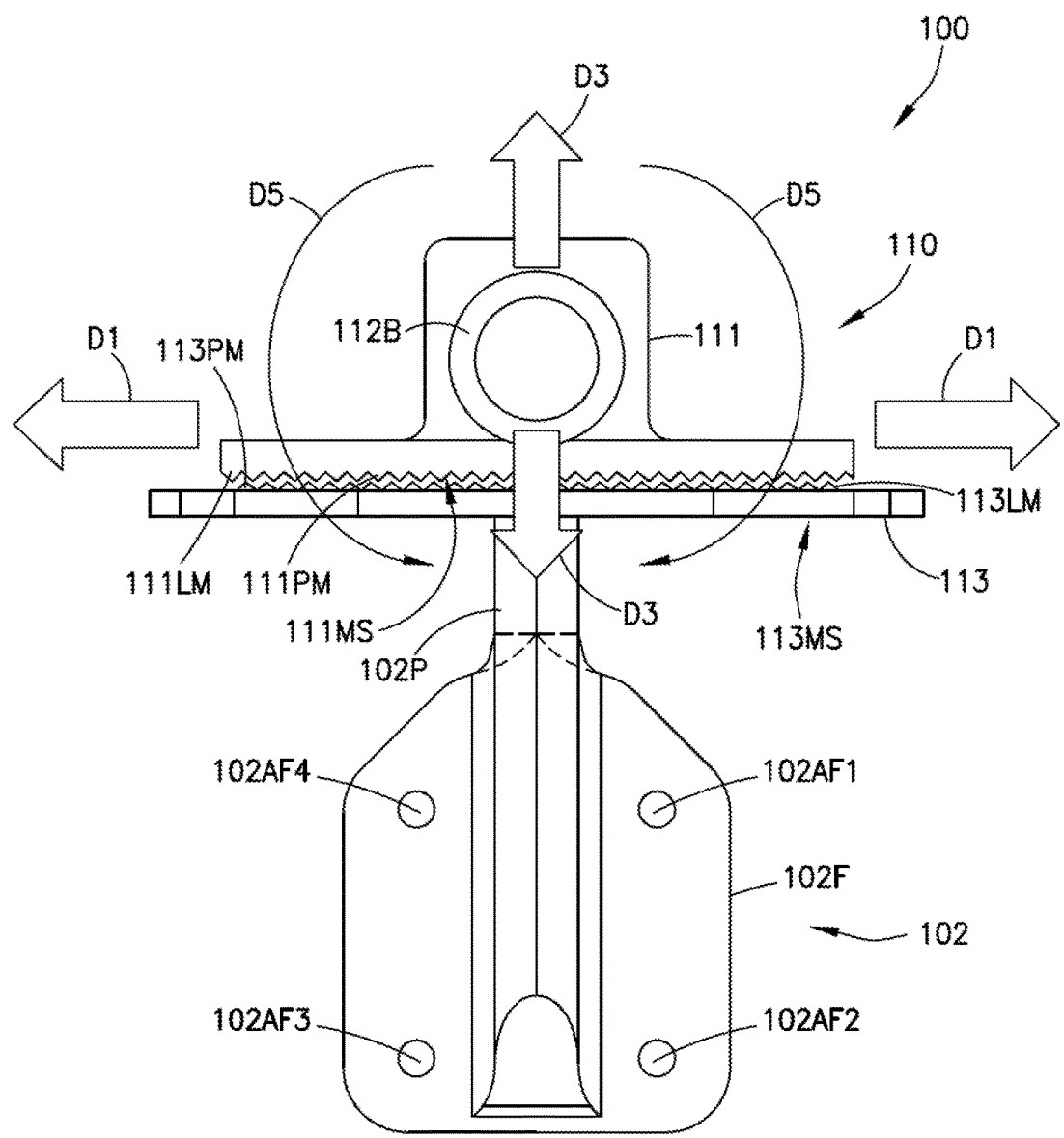
Figure 8:
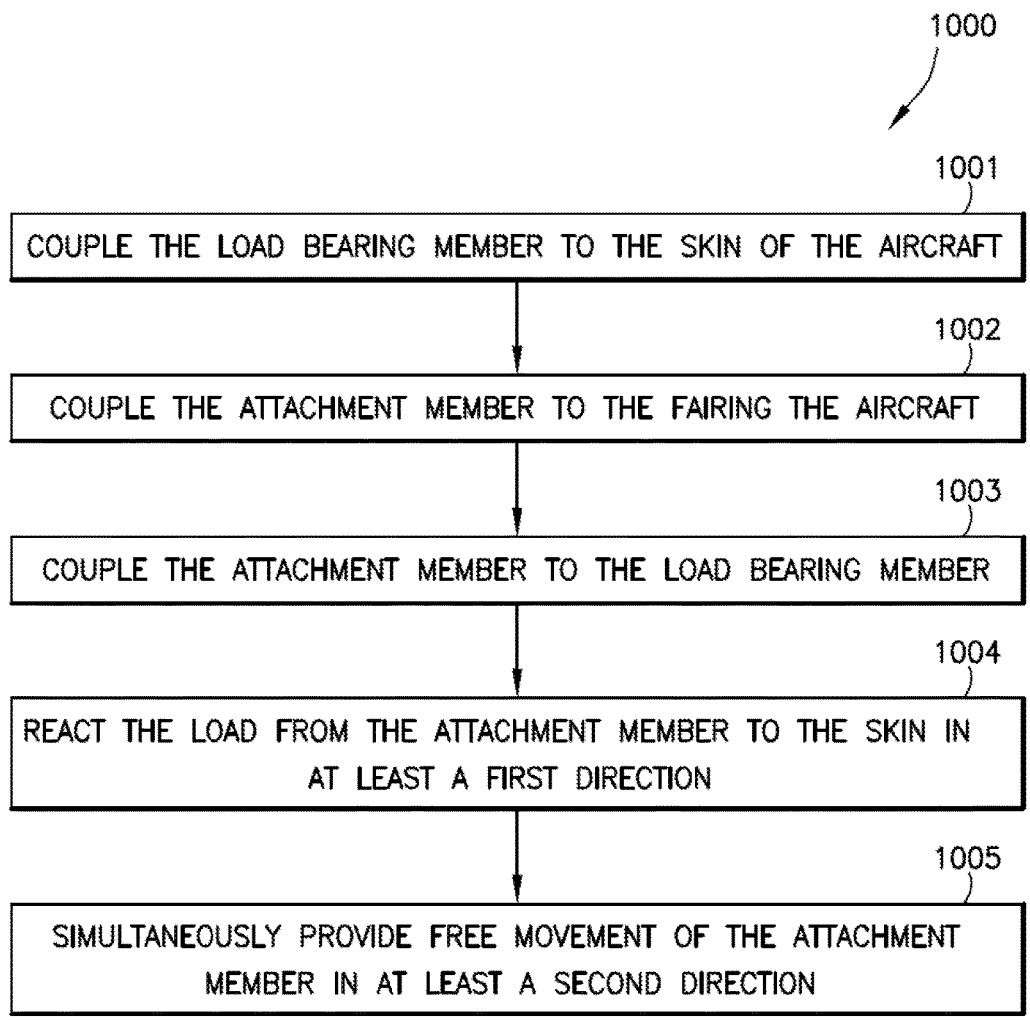
Figure 9:
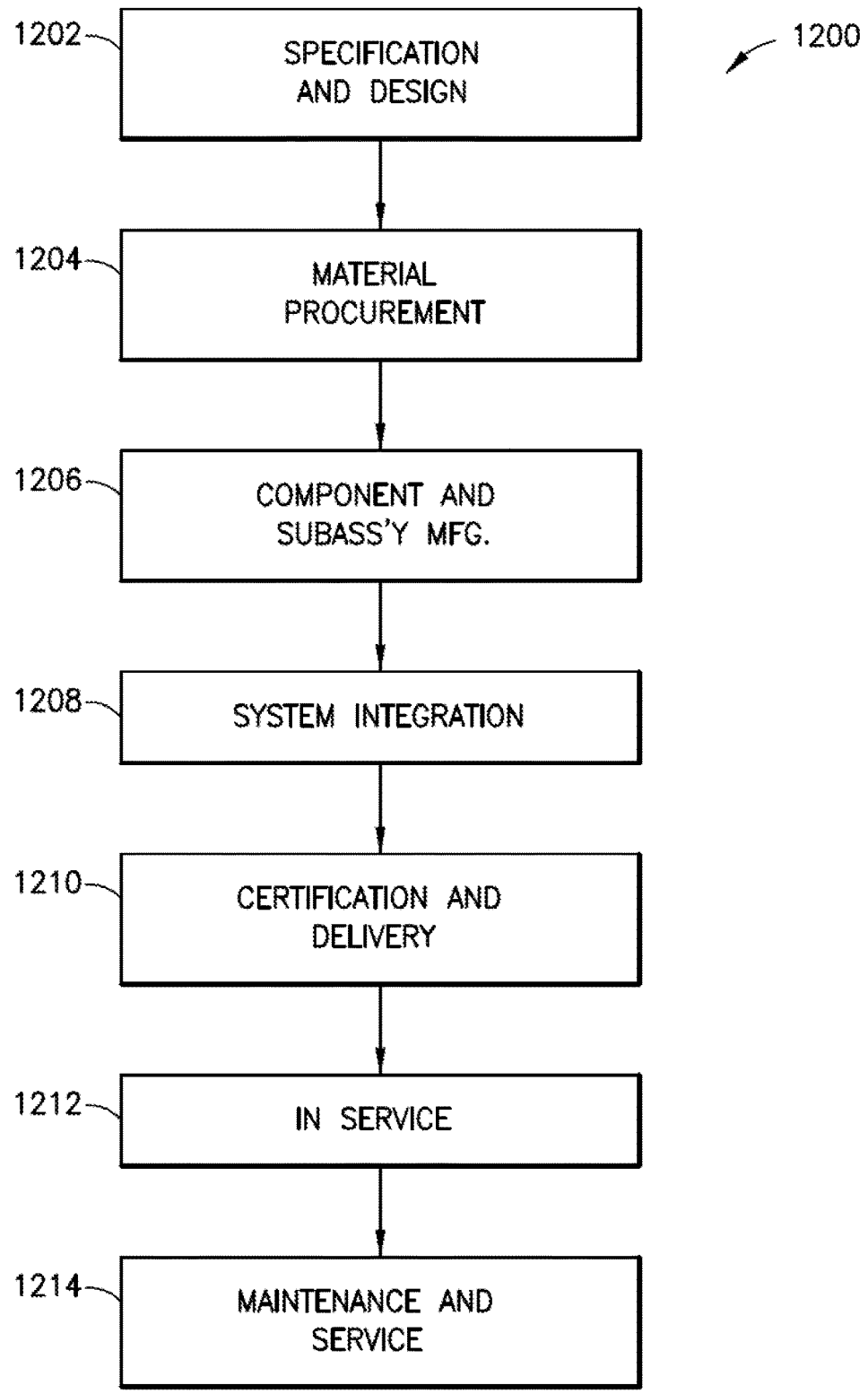

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a schematic illustration of an aircraft including an interface apparatus in accordance with one or more aspects of the present disclosure;

FIGS. 1B-1C are schematic illustrations of the interface apparatus of FIG. 1A in accordance with one or more aspects of the present disclosure;

FIGS. 2A-2B are schematic illustrations of a portion of the interface apparatus of FIG. 1A in accordance with one or more aspects of the present disclosure;

FIGS. 3A-3E are schematic illustrations of portions of the interface apparatus of FIG. 1A in accordance with one or more aspects of the present disclosure;

FIGS. 4A-4B are schematic illustrations of a portion of the interface apparatus of FIG. 1A in accordance with one or more aspects of the present disclosure;

FIG. 5 is a schematic illustration of the interface apparatus of FIG. 1A in accordance with one or more aspects of the present disclosure;

FIGS. 6A and 6B are schematic illustrations of portions of the interface apparatus of FIG. 1A in accordance with one or more aspects of the present disclosure;

FIG. 7 is a schematic illustration of a portion of the interface apparatus of FIG. 1A in accordance with one or more aspects of the present disclosure;

FIG. 8 is a flow chart of a method of use for the interface apparatus of FIG. 1A in accordance with one or more aspects of the present disclosure; and FIG. 9 is a flow chart of an aircraft production and service methodology.

DETAILED DESCRIPTION

The aspects of the present disclosure described herein may provide an interface apparatus 100 which may react loads in one or more directions while providing movement in one or more different directions. Movement in the one or more different directions may provide for multiple degrees of freedom of movement for both installation and in-service movement between structures coupled to each other through the interface apparatus 100. Illustrative, non-exhaustive examples, which may or may not be claimed, of the subject matter according to the present disclosure are provided below.

Referring to FIGS. 1A, 1B, and 1C the aspects of the present disclosure provide an interface apparatus 100 for coupling a first structure 101 (FIG. 1C) to a second structure 103 (FIG. 1C). The interface apparatus 100 may be coupled to the first structure 101 so as to react loads from the second structure 103 in one or more directions, such as direction D1, while providing free movement of the second structure 103 (e.g., within predetermined limits of movement) in one or more different directions, such as directions D2, D3, D5, D6. As will be described herein, load reaction may not be limited to direction D1 and free movement may not be limited to directions D2, D3, D5, D6 as the interface apparatus 100 may be configured to react loads in one or more directions D1-D6 while providing free movement of the second structure 103 in one or more different directions D1-D6.

The aspects of the present disclosure will be described herein with respect to an aircraft 1100 (FIG. 1A). The aircraft generally includes an airframe 1100F, a wing 1101 coupled to the airframe 1100F and an engine 1102. The engine 1102 is coupled to the wing 1101 in any suitable manner where a fairing 1103 is provided to cover the coupling bet the coupling between the engine 1102 and the wing 1101. Here the first structure 101 may be a skin 101A of the wing 1101 and the second structure 103 may be the fairing 1103A. It should be understood that while the aspects of the present disclosure are described herein with respect to the aircraft 1100 for exemplary purposes; the aspects of the present disclosure may be employed to couple a first structure 101 and a second structure 103 to each other in any suitable engineering environment, including but not limited to, e.g., aerospace, automotive, maritime, and civil (e.g., bridges, buildings, etc.) applications.

Referring to FIG. 1B, the interface apparatus 100 provides a compact, stand-alone coupling when compared to a conventional tie-rod 150 and fairing fitting 151 coupling (shown in phantom in FIG. 1B for comparison purposes). FIG. 1B illustrates a size comparison between the interface apparatus 100 and a typical tie-rod/fairing fitting arrangement sized to react loads for a common application. As can be seen in FIG. 1B, the interface apparatus 100 has a smaller height H1 than the fairing fitting 151 (see height H2) used to couple the tie-rod 150 to the skin 101A of the wing 1101. The interface apparatus 100 also does not require additional linkage(s) (i.e., the tie-rod) that extends through seal bulkheads and is thus a stand-alone coupling. Moreover, the interface apparatus 100 is configured, as will be described herein, as a vapor barrier such that the vapor barrier conventionally used with the tie-rod/fairing fitting arrangement may be disposed with. As such, the interface apparatus 100 reduces the part count of the aircraft 1100 while reducing weight and providing for continuous seals to be used at the seal bulkhead(s) within the wing 1101.

In one aspect, the interface apparatus 100 may provide reduced installation time with respect to installation on aircraft 1100 (compared to the conventional tie-rod/fairing fitting, e.g., due to a reduced part count), adjustability upon installation to account for, e.g., assembly tolerances, reaction of forces in multiple directions, and/or multiple degrees of freedom in unconstrained directions.

Referring to FIGS. 1A, 1C and 2A-2B, in one aspect, the interface apparatus 100 generally includes a load bearing member 110 and an attachment member 102 coupled to the load bearing member 110. In one aspect, the load bearing member 110 includes a bearing housing 111 and a bearing 112 (FIG. 1A) and generally has three axes, i.e., a lateral axis 110A1, a longitudinal axis 110A2, and a vertical axis 110A3. It is noted that the directionality of the axes as described herein is for exemplary purposes and any suitable directional identifiers may be used. In one aspect, the load bearing member 110 also includes a baseplate 113 so that the bearing housing 111 is coupled to the first structure 101 through the baseplate 113; however, in other aspects, the bearing housing 111 may be coupled directly to the first structure 101 without the use of the baseplate 113 as described herein.

In one aspect, the load bearing member 110 and the attachment member 102 are formed from the same material, for example, titanium alloy, stainless steel, aluminum alloy, polymer, or any other suitable material. In one aspect, the load bearing member 110 and the attachment member 102 are formed from different materials. In one aspect, the materials of the load bearing member 110 and the attachment member 102 are based on a specific loading condition. For example, in situations with high loading conditions, a high strength material such as titanium alloy or stainless steel may be used; while low loading conditions may use low strength material such as aluminum alloy or polymer.

Referring now to FIGS. 1C, 2A-2B, 3A, and 4A-4B as noted above, in one aspect, the load bearing member 110 includes the bearing housing 111. In one aspect, the bearing housing 111 includes a first aperture 111AP1 (FIG. 3A), a second aperture 111AP2 (FIGS. 1C and 3A), a mating surface 111MS (FIG. 3A), and attachment features 111AF1-111AF4.

In one aspect, the first aperture 111AP1 (best illustrated in FIGS. 2A and 3A) extends along the longitudinal axis 110A2 of the load bearing member 110 and defines a bore 111B having a diameter X (FIG. 2A). The first aperture 111AP1 is configured to receive the bearing 112 such that the bearing 112 is slidably disposed within the first aperture 111AP1 of the bearing housing 111 and housed at least partially within the bore 111B. In one aspect, the bore 111B defined by the first aperture 111AP1 extends along the longitudinal axis 110A2 a distance Y. As such, the bearing 112 may slidably move along the longitudinal axis 110A2 of the load bearing member 110 in direction D2. In one aspect, while the bearing 112 is free to move along the longitudinal axis 110A2, the bore 111B of the bearing housing 111 is configured to constrain the bearing 112 in at least another direction (i.e., directions D1, D3 (FIG. 1C)). In one aspect, the first aperture 111AP1 may extend along the lateral axis 110A1, where the second aperture 111AP2 is shaped and sized so that the bearing 112 is free to move longitudinally in direction D2 and rotationally in at least direction D5, while being constrained from movement, by the first aperture 111AP1, with respect to the bearing housing 111 in directions D1 and D3.

In one aspect, the second aperture 111AP2 of the bearing housing 111 is configured to receive the attachment member 102 so that the attachment member 102 may be coupled to the bearing 112 disposed within the bore 111B of the bearing housing 111. In one aspect, the second aperture 111AP2 of the bearing housing 111 includes at least one stop surface, i.e., pivot stop surface 111PSS and/or linear stop surface 111LSS. The linear stop surface 111LSS is configured to limit linear movement of the attachment member 102, for example, in at least direction D2 along the longitudinal axis 110A2 of the bearing housing 111. The linear stop surface 111LSS limiting movement of the attachment member 102 along the longitudinal axis 110A2 provides for the bearing 112 to slide a predetermined distance Y' (FIG. 2A) before movement is stopped so that the bearing 112 is maintained within the bore 111B of the bearing housing 111, i.e., movement of the bearing 112 in direction D2 is not sufficient to cause disengagement of the bearing 112 from the bore 111B. The pivot stop surface 111PSS limits movement of the attachment member 102 about the longitudinal axis 110A2 and provides for the bearing 112 to pivot about longitudinal axis 110A2 a predetermined distance before pivoting movement is stopped. As described herein, it is the attachment member 102 that may engage the at least one stop surface for limiting movement of the bearing 112 and/or the attachment member 102.

Referring to FIGS. 4A, 5, and 6A, the mating surface 111MS of the bearing housing 111 is configured to be mated with one or more of the baseplate 113 or the first structure 101. In one aspect, the mating surface 111MS of the bearing housing 111 includes second locking members 111LM having protruding members 111PM. In one aspect, the protruding members 111PM are configured to interface with first locking members 113LM of the baseplate 113 as will be further described below. In one aspect, the protruding members 111PM are configured to interface with the first structure 101 to secure the bearing housing 111 to the first structure 101 and limit movement of the bearing housing 111, such as through frictional/mechanical engagement with the first structure 101.

Referring to FIGS. 1C, 2A-2B, 3A and 4A-4B, the attachment features 111AF1-111AF4 of the bearing housing 111 are configured to couple the bearing housing 111 to the baseplate 113 and/or the first structure 101. In one aspect, the attachment features 111AF1-111AF4 are apertures, through which any suitable fastener passes to couple the bearing housing 111 to any suitable structure such at the first structure 101 and/or the baseplate 113 as described herein. In one aspect, the apertures of the attachment features 111AF1-111AF4 are slotted (i.e., elongated apertures) so that during installation, the bearing housing 111 may move, e.g., in direction D1, for aligning the attachment features 111AF1-111AF4 with second attachment features 113AF5-113AF8 of the baseplate 113 and/or to accommodate a relative position of the fairing 1103A/second structure 103 relative to the skin 101A of the wing 1101/the first structure 101. In one aspect, the attachment features 111AF1-111AF4 may be any suitable attachment features such as pins, clips, threaded studs, apertures through which fasteners pass, etc.

Figure 3A:
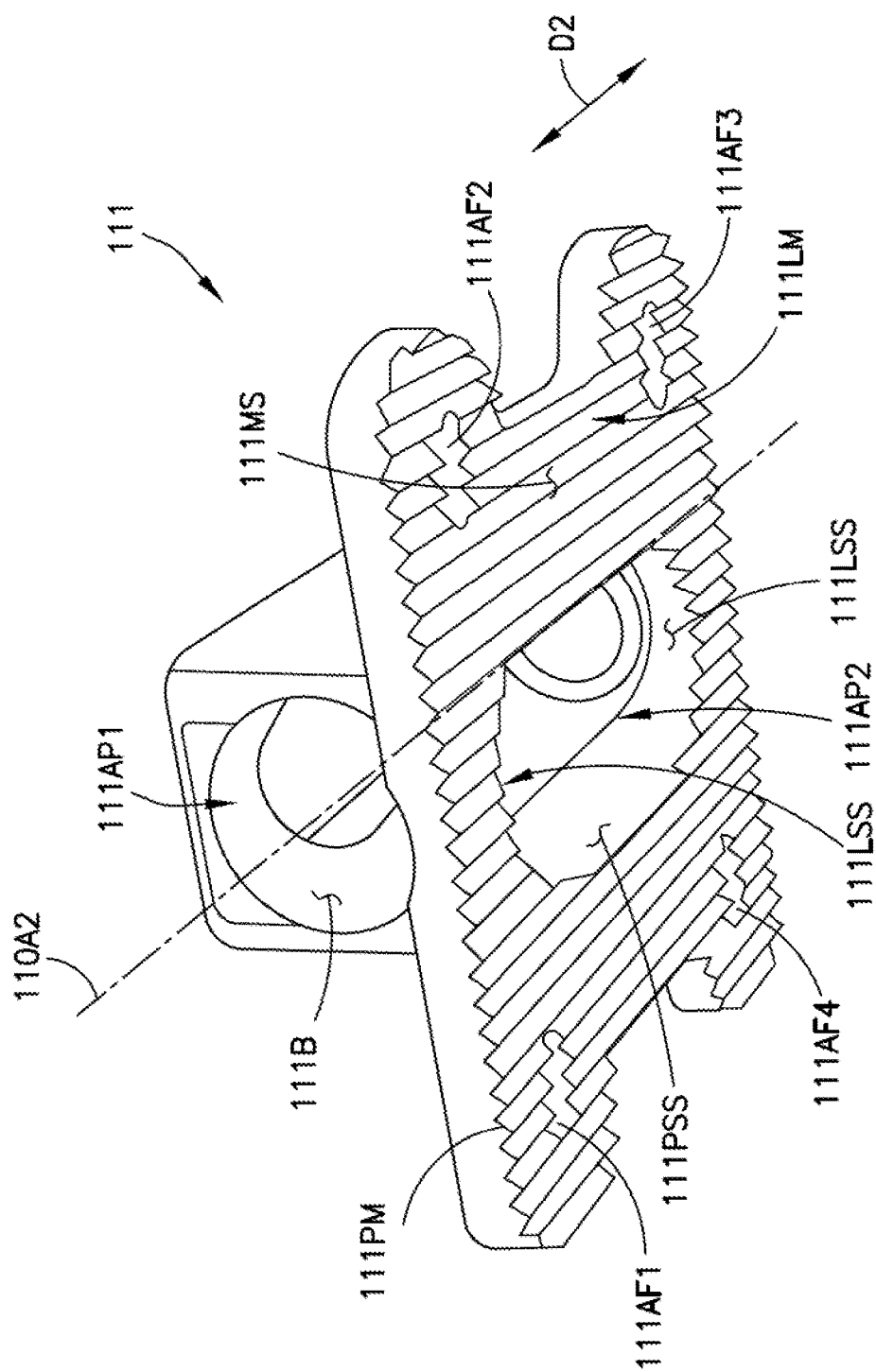
Figure 3B:
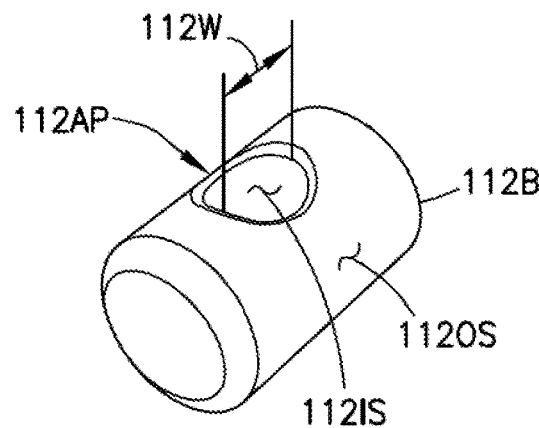
Figure 3E:
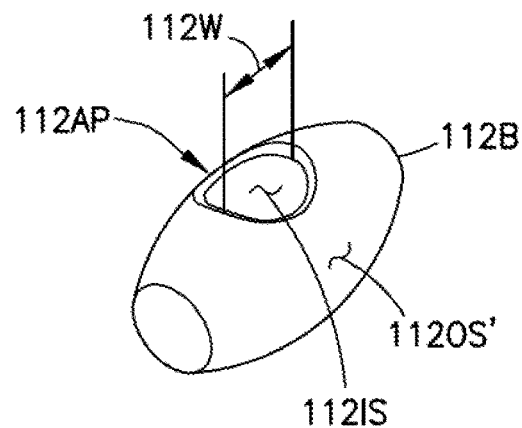
Figure 3C:
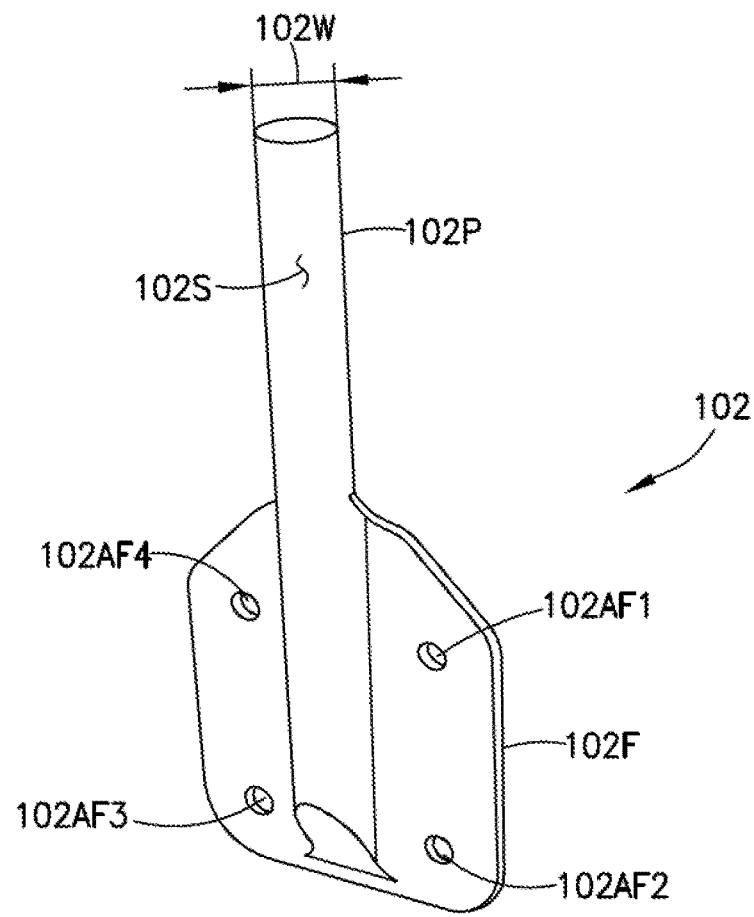

Referring now to FIGS. 1A, 1C, 2A-2B, 3B, 4A, and 6A-6B, the bearing 112 may be a barrel bearing 112B (FIGS. 2A-2B, 3B, 4A), an elastomeric bushing 112E (FIG. 6), or any other suitable bearing. The bearing 112 (FIG. 1A) generally includes an outer surface 112OS (FIGS. 3B and 6B) and an aperture 112AP (FIGS. 3B and 6B) having an inner surface 112IS (FIGS. 3B and 6B).

The bearing 112 couples with the attachment member 102 so as to couple the attachment member 102 to the load bearing member 110. In one aspect, the aperture 112AP extends through the bearing 112 and has a diameter 112W. The aperture 112AP of the bearing member 112 is configured to receive the attachment member 102 so that at least a portion of the attachment member 102 is disposed within the aperture 112AP of the bearing 112. While the aperture 112AP is shown and described as being cylindrical in shape, in other aspects, the aperture may have any suitable cross-section for providing at least linear movement of the attachment member 102. For example, the diameter 112W or other cross sectional dimension(s) of the aperture 112AP is configured (e.g., sized) to guide linear/pivoting movement of the attachment member 102 relative to the bearing housing 111 (i.e., linear movement in direction D3 and/or rotational movement of the attachment member 102 in direction D6. In one aspect, the cross section of the aperture 112AP (e.g., the aperture 112AP may have a rectangular, triangular, etc. shape) may be shaped/keyed to constrain pivotal movement of the attachment member 102 in direction D6.

In one aspect, the bearing 112 provides the attachment member 102 with at least two degrees of freedom linear movement relative to the bearing housing 111 (i.e., along longitudinal axis 110A2 in direction D2 and/or along vertical axis 110A3 in direction D3). In another aspect, the coupling between the bearing 112 and the attachment member 102 may be such that movement of the attachment member 102 in direction D3 is constrained. In one aspect, the bearing 112 is configured to provide at least one degree of freedom pivoting movement of the attachment member 102 relative to the bearing housing 111 (i.e., pivoting about longitudinal axis 110A2 in direction D5). For example, where the bearing 112 is a barrel bearing 112B (e.g., FIGS. 2A and 3B), the bore 111B is a cylindrical bore (e.g. having a circular/semi-circular cross section) configured to allow rotation of the barrel bearing 112B within the bore 111B about longitudinal axis 110A2 in direction D5. As described herein, the aperture 112AP may be a cylindrical aperture configured so that the attachment member 102 pivots/rotates within the aperture 112AP about the vertical axis 110A3 in direction D6. In one aspect, the outer surface 112OS' of the barrel bearing 112B may be arcuate to form at least a semi-spherical bearing (FIG. 3E) that provides pivotal movement of the attachment member 102 about longitudinal axis 110A2 in direction D5 as well as pivotal movement of the attachment member 102 about lateral axis 110A1 in direction D4. As another example, where the bearing 112 is an elastomeric bearing 112E (FIGS. 6A and 6B), the bore 111B may have a rectangular cross section so as to provide the elastomeric bearing 112E with linear movement in direction D2 and constrain movement of the elastomeric bearing 112E in directions D1 and D3. Here, the resiliency of the elastomeric bearing 112E may provide pivoting movement of the attachment member 102 in directions D4 and D5 while the aperture 112AP provides linear movement of the attachment member 102 in direction D3 and/or rotational movement in direction D6. In one aspect, the bearing 112 is configured to provide any member degrees of freedom of linear and/or pivoting movement of the attachment member 102 relative to the bearing housing 111.

Referring to FIGS. 1C, 2A-2B, 3D, 4A-4B, and 7, the baseplate 113 may have any suitable size and shape for coupling the bearing housing 111 to the first structure 101. The baseplate 113 includes the first locking members 113LM, mounting surface 113MS (on an opposite side of the baseplate 113 relative to the locking members 113LM), first attachment features 113AF1-113AF4 and second attachment features 113AF5-113AF8. The base plate 113 includes an aperture 300 (FIG. 3D) disposed therethrough, where the attachment member 102 extends through the aperture 300 for coupling with the bearing member 112. The aperture 300 is sized to accommodate the linear and/or pivotal movement of the attachment member described herein. The attachment features 113AF1-113AF4 may be cylindrical or slotted apertures through which any suitable fasteners 450 (FIGS. 4A and 6A) pass for coupling the baseplate 113 to the first structure 101 (noting that the first structure has a hole pattern corresponding to a hole pattern of the attachment features 113AF1-113AF4 to facilitate coupling of the baseplate 113 with the first structure 101 with the fasteners 450). Here the mounting surface 113MS interfaces with the first structure 101 when the baseplate 113 is coupled to the first structure 101. The second attachment features 113AF5-113AF8 may also be cylindrical or slotted apertures through which any suitable fasteners 451 (FIG. 4A) pass for coupling the bearing housing 111 to the baseplate 113 (noting that a hole pattern of the attachment features 111AF1-111AF4 corresponds with a hole pattern of the attachment features 113AF5-113AF8 to facilitate coupling of the bearing housing 111 to the baseplate 113 with the fasteners 451). The first locking members 113LM of the baseplate 113 include protruding members 113PM configured to mate with and engage the corresponding protruding members 111PM of the bearing housing 111. In this aspect, the bearing housing 111 is coupled to the baseplate 113 and the baseplate 113 is, in turn, coupled to the first structure 101 (e.g., so that the bearing housing 111 is coupled to the first structure 101 through the baseplate 113); however, as described herein the bearing housing 111 may be coupled directly to the first structure 101 without any intervening members disposed between the mounting surface 111MS of the bearing housing 111 and the first structure 101 (see FIG. 5).

Generally, on assembly, the slotted fastening features 111AF1-111AF4 of the bearing housing 111 provide for lateral movement of the bearing housing 111 (in direction D2) relative to the baseplate 113 to accommodate, for example, any possible misalignment between the fairing 1103A and the skin 101A of the wing 1101 (FIG. 1) so that the attachment member 102 may be inserted into the bearing member 112. The protruding members 113PM and the corresponding protruding members 111PM substantially prevent lateral movement between the baseplate 113 and the bearing housing 111 when the fasteners 451 are tightened/secured. It is noted that the fasteners 451 and 450 may be configured as blind fasteners so that only one end of the fastener need be accessible for tightening the fastener 450, 451. For example, on assembly the fairing 1103A may cover/obstruct an exterior area of the wing 1101 skin 101A where the fasteners 450, 451 are located. Here, the fasteners 450, 451 may be tightened from an interior of the wing 1101, e.g., from a side of the baseplate 113 to which the bearing housing 111 is coupled (see e.g. FIGS. 4A and 6A).

Referring to FIGS. 1A, 1C, 2A, 3C, 4B and 7, the attachment member 102 includes a stem/pin 102P, a mounting member 102F, and attachments features 102AF1-102AF4. The pin 102P is configured to interface with the aperture 112AP of the bearing 112. In one aspect, the pin 102P may be fixedly coupled to the bearing 112 so as to constrain movement of the attachment member 102 in one or more of directions D3, D6. For example, the pin 102P may be threaded into the aperture 112AP or coupled to the bearing 112 with any suitable fastener. As rioted above, the pin 102P may include a cross section that corresponds with a cross section of the aperture 112AP so as to key or constrain rotational movement of the attachment member 102 in direction D6. In one aspect, while rotation of the attachment member 102 may be constrained in direction D6 or free in direction D6, the pin 102P may be slidably coupled within the aperture 112AP so as to freely move (without constraint) in direction D3 (e.g., the pin 102P may slide freely within the aperture 112AP while remaining coupled to the bearing 112 via the relationship between the first structure 101 and the second structure 103). In other aspects, the attachment member 102 may be coupled to the bearing 112 in any suitable manner so as to provide or constrain movement of the attachment member 102 relative to the bearing 112 in one or more of directions D3, D6. In one aspect, the inner surface 112IS of the aperture 112AP and a surface 102S of the pin 102P of the attachment member 102 (and the bore 111 of the bearing housing 111) may be coated with a low friction coating or material, e.g., Teflon or Karon, to improve function and/or service life of the interface apparatus 100.

In one aspect, the mounting member 102F of the attachment member 102 is configured to mate with the second structure 103 and the attachment features 102AF1-102AF4 are configured to fixedly couple the second structure 103 to the attachment member 102. In one aspect, the attachment features 102AF1-102AF4 are substantially similar to one or more of the attachment features 111AF1-111AF4, 113AF1-113AF8 described above. While the attachment feature 102 is illustrated as having a substantially square configuration with four attachment features, it is noted that the attachment feature 102 may have any suitable configuration and any suitable number of attachment features, for example, depending on specific loading conditions and/or the size/shape of the second structure 103. With the second structure 103 coupled to the attachment member 102, the first structure 101 is effectively coupled to the second structure 103 via the load bearing member 110 and the attachment member 102 so that a load 103L of the second structure 103 may be reacted through the load bearing member 110 to the first structure 101.

As noted above, the bearing 112 housed in the bearing member 111 and the attachment member 102 disposed in the bearing 112 are configured to move relative to one another. In one aspect, clearances between each of the bearing housing 111 and the bearing 112, and the bearing 112 and the attachment member 102 are sufficiently tight (e.g., close-fit tolerances) to substantially prevent vapors from migrating through the interface apparatus 100 (i.e., from outside the wing 1101 to an interior of the wing 1101 or vice versa). In one aspect, one or more of the load bearing member 110 and the baseplate 113 may provide sealing properties to seal the first structure 101. For example, a chemical sealant may be disposed between the baseplate 113 and the skin 101A of the wing 1101 and/or between the baseplate 113 and the load bearing member 110 where the chemical sealant further prevents vapor migration between the interface apparatus 100 and the first structure 101. In one aspect, as seen in FIG. 4B, the interface apparatus 100 may further include a seal 400 disposed around the pin 102P of the attachment member 102 to provide a seal between, e.g., the first structure 101 (i.e., the skin 101A of the wing 1101) and the interface apparatus 100. In one aspect, the seal 400 is a closed cell foam, e.g., a polymeric seal.

Referring now to FIGS. 1C, 7 and 8, a method 1000 of use for the interface apparatus 100 is illustrated. The interface apparatus 100 is configured to couple to the first structure 101 (i.e., the skin 101A of the aircraft 1100) and second structure 103 (i.e., the fairing 1103A of the aircraft 1100), such that the interface apparatus 100 reacts the load 103L of the second structure 103 applied to the interface apparatus 100 to the first structure 101. As noted above, the load bearing member 110 is coupled to the attachment member 102 so as to form the interface apparatus 100. The load bearing member 110 (i.e., the bearing housing 111 and/or the baseplate 113) is coupled to the skin 101A of the aircraft 1100 (FIG. 9, Block 1001). The attachment member 102 is coupled to the fairing 1103A of the aircraft 1100 (FIG. 9, Block 1002). The attachment member 102 is coupled to the load bearing member 110 (e.g., through coupling of the attachment member 102 to the bearing 112 as described herein) and the fasteners 450, 451 are tightened/screwed (FIG. 8, Block 1003). Loads 103L from the attachment member 102 are reacted to the skin 101A (e.g., the first structure 101) in at least a first direction with the load bearing member 110 coupled to the skin 101A where the attachment member 102 is coupled to the load bearing member 110 (as described herein) (FIG. 8, Block 1004). Free movement of the attachment member 102 is provided, simultaneously with reacting the loads 103L, with the load bearing member 110 in at least a second direction (FIG. 8, Block 1005). For example, the load bearing member 110 provides the attachment member 102 (and therefore the fairing 1103A), via the bearing 112 housed in the bearing housing 111, with free (e.g., unconstrained) linear and/or rotational movement in one or more directions D1-D6 while reacting the load 103L of the second structure 103 in one or more different directions D1-D6.

For example, in the aspects illustrated in FIGS. 1C and 7, the bearing 112 and bearing housing 111 reacts the loads 103L from the attachment member 102 in direction D1 while providing the attachment member 102 and the fairing 1103A free linear or rotational movement along one or more of the longitudinal axis 110A2 (direction D2) and/or the vertical axis 110A3 (direction D3) of the load bearing member 110. In one aspect, the bearing 112 and bearing housing 111 provides the attachment member 102 and the fairing 1103A free linear movement of about ±0.15 inches or any other suitable distance greater or less than about ±0.15 inches along the longitudinal axis 110A2 in direction D2. In one aspect, the bearing 112 and the bearing housing 111 provides the attachment member 102 and the fairing 1103A free linear movement of about +0.2 inches or any other suitable distance greater or less than about ±0.2 inches along the vertical axis 110A3 in direction D3. In one aspect, the bearing 112 and the bearing housing 111 provides the attachment member 102 and the fairing 1103A free rotational movement of about ±15° or any other suitable distance greater or less than about ±15° about the longitudinal axis 110A2 of the load bearing member 110 in direction D5. In one aspect, the bearing 112 and the bearing housing 111 provides the attachment member 102 and the fairing 1103A free rotational movement any suitable distance about the lateral axis 110A1 of the load bearing member 110 in direction D4.

As noted above, the free (e.g., unconstrained) movement directions may not be limited to directions D2, D3, D4, D5 and the load reaction direction may not be limited to one direction, such as direction D1. For example, the bearing 112 may extend along the lateral axis 110A1 such that the bearing 112 is free to move along the lateral axis 110A1 in direction D1 while reaction of the load 1103L (FIG. 1A) of the fairing 1103A is along the longitudinal axis 110A2 in direction D2.

Referring to FIGS. 1A and 9, examples of the present disclosure may be described in the context of aircraft manufacturing and service method 1200 as shown in FIG. 9. In other aspects, the examples of the present disclosure may be applied in any suitable industry, such as e.g. automotive, maritime, aerospace, civil, etc. as noted above. With respect to aircraft manufacturing, during pre-protection, illustrative method 1200 may include specification and design (block 1202) of aircraft 1100 and material procurement (block 1204). During production, component and subassembly manufacturing (block 1206) and system integration (block 1208) of aircraft 1100 may take place. Thereafter, aircraft 1100 may go through certification and delivery (block 1210) to be placed in service (block 1212). While in service, aircraft 1100 may be scheduled for routine maintenance and service (block 1214). Routine maintenance and service may include modification, reconfiguration, refurbishment, etc. of one or more systems of aircraft 1100 which may include the interface apparatus 100 as described herein.

Each of the processes of illustrative method 1200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1200. For example, components or subassemblies corresponding to component and subassembly manufacturing (block 1206) may be fabricated or manufactured in a manner similar to components or subassemblies produced while aircraft 1100 is in service (block 1212). Also, one or more examples of the apparatus(es), method(s), or combination thereof may be utilized during production stages 1206 and 1208, for example, by substantially expediting assembly of or reducing the cost of aircraft 1100. Similarly, one or more examples of the apparatus or method realizations, or a combination thereof, may be utilized, for example and without limitation, while aircraft 1100 is in service (block 1212) and/or during maintenance and service (block 1214).

The following are provided in accordance with the aspects of the present disclosure:

A1. An interface apparatus comprising:
a load bearing member configured for coupling to a structure; and
an attachment member coupled to the load bearing member;
wherein the load bearing member is configured to react loads, from the attachment member to the structure, in at least a first direction while substantially simultaneously providing free movement of the attachment member in at least a second direction.

A2. The interface apparatus of paragraph A1, wherein the load bearing member has a longitudinal axis and a lateral axis and the load bearing member is configured to react loads, from the attachment member to the structure, along at least the lateral axis.

A3. The interface apparatus of paragraph A2, wherein the load bearing member provides free movement of the attachment member in at least one direction transverse to the longitudinal axis.

A4. The interface apparatus of paragraph A2, wherein the load bearing member provides free movement of the attachment member along at least the longitudinal axis.

A5. The interface apparatus of paragraph A2, wherein the load bearing member provides free pivoting movement of the attachment member about the longitudinal axis.

A6. The interface apparatus of paragraph A2, wherein the load bearing member provides free pivoting movement of the attachment member about an axis (e.g. longitudinal axis) of the attachment member so that the attachment member is free to rotate relative to the load bearing member.

A7. The interface apparatus of paragraph A1, wherein the load bearing member comprises:
a baseplate configured for coupling to the structure;
a bearing housing coupled to the baseplate; and
a bearing, the attachment member being coupled (e.g. fixedly or slidably) to the bearing;
wherein the bearing housing is configured to house the bearing so as to constrain the bearing in at least the first direction and to provide free movement of the bearing in at least the second direction.

A8. The interface apparatus of paragraph A7, wherein the bearing includes an aperture and the attachment member is slidably disposed within the aperture.

A9. The interface apparatus of paragraph A5, wherein the attachment member rotates relative to the bearing.

A10. The interface apparatus of paragraph A5, wherein the aperture is configured to guide linear movement of the attachment member relative to the bearing.

A11. The interface apparatus of paragraph A7, wherein the bearing is configured to provide at least one degree of freedom pivoting movement of the attachment member relative to the bearing housing.

A12. The interface apparatus of paragraph A7, wherein the bearing is configured to provide the attachment member with at least three degrees of freedom movement relative to the bearing housing.

A13. The interface apparatus of paragraph A7, wherein the bearing housing includes a first aperture, where the bearing is slidably disposed within the first aperture.

A14. The interface apparatus of paragraph A7, wherein the bearing housing includes a second aperture having at least one stop surface, the at least one stop surface being configured to limit movement of the attachment member in at least the second direction.

A15. The interface apparatus of paragraph A14, wherein the at least one stop surface is configured to limit movement of the attachment member in at least the second direction about a longitudinal axis of the bearing housing, where the movement is a pivoting movement.

A16. The interface apparatus of paragraph A14, wherein the at least one stop surface is configured to limit movement of the attachment member in at least the second direction along a longitudinal axis of the bearing housing.

A17. The interface apparatus of paragraph A7, wherein:
the baseplate includes first locking members; and
the bearing housing includes second locking members, the second locking members being configured to engage the first locking members.

A18. The interface apparatus of paragraph A17, wherein the first locking members and the second locking members each comprise a series of protruding members.

A19. The interface apparatus of paragraph A7, wherein the bearing is one of a barrel bearing or an elastomeric bushing.

A20. The interface apparatus of paragraph A1, wherein the attachment member is configured for coupling with a secondary structure.

A21. The interface apparatus of paragraph A20, wherein the secondary structure is an aircraft engine strut fairing and the structure is an aircraft wing panel.

A22. The interface apparatus of paragraph A1, wherein the structure is a structural panel.

B1. An interface apparatus comprising:
a bearing housing configured for coupling to a structure; and
a bearing having an attachment member coupled (e.g., fixedly or slidably) thereto;
wherein the bearing housing is configured to house the bearing so as to constrain the bearing in at least a first direction and to provide free movement of the bearing in at least a second direction, wherein the bearing housing, housing the bearing, is configured to react loads, from the attachment member to the structure, in at least the first direction while substantially simultaneously providing free movement of the attachment member in at least the second direction.

B2. The interface apparatus of paragraph B1, wherein the bearing housing has a longitudinal axis and a lateral axis and the bearing housing is configured to react loads, from the attachment member to the structure, along at least the lateral axis.

B3. The interface apparatus of paragraph B2, wherein the bearing provides free movement of the attachment member in at least one direction transverse to the longitudinal axis.

B4. The interface apparatus of paragraph B2, wherein the bearing provides free movement of the attachment member along at least the longitudinal axis.

B5. The interface apparatus of paragraph B2, wherein the bearing provides free pivoting movement of the attachment member about the longitudinal axis.

B6. The interface apparatus of paragraph B2, wherein the bearing provides free pivoting movement of the attachment member about an axis (e.g. longitudinal axis) of the attachment member so that the attachment member is free to rotate relative to the bearing housing.

B7. The interface apparatus of paragraph B1, wherein the bearing includes an aperture and the attachment member is slidably disposed within the aperture.

B8. The interface apparatus of paragraph B7, wherein the attachment member rotates relative to the bearing.

B9. The interface apparatus of paragraph B7, wherein the aperture is configured to guide linear movement of the attachment member relative to the bearing.

B10. The interface apparatus of paragraph B1, wherein the bearing is configured to provide at least one degree of freedom pivoting movement of the attachment member relative to the bearing housing.

B11. The interface apparatus of paragraph B1, wherein the bearing is configured to provide the attachment member with at least three degrees of freedom movement relative to the bearing housing.

B12. The interface apparatus of paragraph B1, wherein the bearing housing includes a first aperture, where the bearing is slidably disposed within the first aperture.

B13. The interface apparatus of paragraph B1, wherein the bearing housing includes a second aperture having at least one stop surface, the at least one stop surface being configured to limit movement of the attachment member in at least the second direction.

B14. The interface apparatus of paragraph B13, wherein the at least one stop surface is configured to limit movement of the attachment member in at least the second direction about a longitudinal axis of the bearing housing, where the movement is a pivoting movement.

B15. The interface apparatus of paragraph B13, wherein the at least one stop surface is configured to limit movement of the attachment member in at least the second direction along a longitudinal axis of the bearing housing.

B16. The interface apparatus of paragraph B1, wherein the attachment member is configured for coupling with a secondary structure.

B17. The interface apparatus of paragraph B16, wherein the secondary structure is an aircraft engine strut fairing and the structure is an aircraft wing panel.

B18. The interface apparatus of paragraph B1, wherein the bearing is one of a barrel bearing or an elastomeric bushing.

B19. The interface apparatus of paragraph B1, further comprising a baseplate, the bearing housing being configured for coupling to the structure through the baseplate.

B20. The interface apparatus of paragraph B19, wherein:
the baseplate includes first locking members; and
the bearing housing includes second locking members, the second locking members being configured to engage the first locking members.

B21. The interface apparatus of paragraph B20, wherein the first locking members and the second locking members each comprise a series of protruding members.

B22. The interface apparatus of paragraph B1, wherein the structure is a structural panel.

C1. A method comprising:
reacting loads, from an attachment member to a structure, in at least a first direction with a load bearing member coupled to the structure where the attachment member is coupled to the load bearing member; and
substantially simultaneously providing free movement of the attachment member, with the load bearing member, in at least a second direction.

C2. The method of paragraph C1, wherein the load bearing member has a longitudinal axis and a lateral axis, the method further comprising reacting loads, with the load bearing member, from the attachment member to the structure, along at least the lateral axis.

C3. The method of paragraph C2, further comprising providing, with the load bearing member, free movement of the attachment member in at least one direction transverse to the longitudinal axis.

C4. The method of paragraph C2, further comprising providing, with the load bearing member, free movement of the attachment member along at least the longitudinal axis.

C5. The method of paragraph C2, further comprising providing, with the load bearing member, flee pivoting movement of the attachment member about the longitudinal axis.

C6. The method of paragraph C2, further comprising providing, with the load bearing member, free pivoting movement of the attachment member about an axis (e.g. longitudinal axis) of the attachment member so that the attachment member is free to rotate relative to the load bearing member.

C7. The method of paragraph C1, further comprising
constraining a bearing hi a bearing housing of the load bearing member in at least the first direction, where the bearing housing is coupled to a baseplate and the baseplate is coupled to the structure; and
providing free movement of the bearing in at least the second direction, where the attachment member is coupled to the bearing.

C5. The method of paragraph C7, further comprising guiding, with an aperture of the bearing, linear movement of the attachment member relative to the bearing.

C9. The method of paragraph C7, wherein the bearing housing includes a second aperture having at least one stop surface, the method further comprising limiting, with the at least one stop surface, movement of the attachment member in at least the second direction.

C10. The method of paragraph C9, further comprising limiting, with the at least one stop surface, movement of the attachment member in at least the second direction about a longitudinal axis of the bearing housing, where the movement is a pivoting movement.

C11. The method of paragraph C9, further comprising limiting, with the at least one stop surface, movement of the attachment member in at least the second direction along a longitudinal axis of the bearing housing.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 8 and 9, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8 and 9 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification.

For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An interface apparatus comprising:
   a load bearing member configured for coupling to a structure, the load bearing member comprising
      a baseplate having first locking members, and
      a bearing housing having second locking members that are configured to engage the first locking members; and
   an attachment member coupled to the load bearing member;
   wherein the load bearing member is configured to react loads, from the attachment member to the structure, in at least a first direction while simultaneously providing free movement of the attachment member in at least a second direction, and the first locking members and the second locking members each comprise a series of protruding members.

2. The interface apparatus of claim 1, wherein the load bearing member has a longitudinal axis and a lateral axis and the load bearing member is configured to react loads, from the attachment member to the structure, along at least the lateral axis.

3. The interface apparatus of claim 2, wherein the load bearing member provides free movement of the attachment member in at least one direction transverse to the longitudinal axis.

4. The interface apparatus of claim 2, wherein the load bearing member provides free movement of the attachment member along at least the longitudinal axis.

5. The interface apparatus of claim 2, wherein the load bearing member provides free pivoting movement of the attachment member about the longitudinal axis.

6. The interface apparatus of claim 1, wherein:
   the baseplate is configured for coupling to the structure;
   the bearing housing is coupled to the baseplate; and
   the load bearing member further comprises a bearing, the attachment member being coupled to the bearing;
   wherein the bearing housing is configured to house the bearing so as to constrain the bearing in at least the first direction and to provide free movement of the bearing in at least the second direction.

7. The interface apparatus of claim 1, wherein the attachment member is configured for coupling with a secondary structure.

8. An interface apparatus comprising:
   a bearing housing configured for coupling to a structure and having a longitudinal axis; and
   a barrel bearing having a cylindrical body, extending along the longitudinal axis of the bearing housing, and an attachment member coupled thereto;
   wherein the bearing housing is configured to house the barrel bearing so as to constrain the barrel bearing in at least a first direction and to provide free movement of the barrel bearing in at least a second direction along the longitudinal axis, wherein the bearing housing, housing the barrel bearing, is configured to react loads, from the attachment member to the structure, in at least the first direction while simultaneously providing free movement of the attachment member in at least the second direction;
   wherein the barrel bearing includes a bearing aperture and the attachment member is slidably disposed within the bearing aperture.

9. The interface apparatus of claim 8, wherein the bearing aperture is configured to guide linear movement of the attachment member relative to the barrel bearing.

10. The interface apparatus of claim 8, wherein the barrel bearing is configured to provide the attachment member with at least three degrees of freedom movement relative to the bearing housing.

11. The interface apparatus of claim 8, wherein the bearing housing includes a first aperture, where the barrel bearing is slidably disposed within the first aperture.

12. The interface apparatus of claim 8, wherein the bearing housing includes a second aperture having at least one stop surface, the at least one stop surface being configured to limit movement of the attachment member in at least the second direction.

13. The interface apparatus of claim 12, wherein the at least one stop surface is configured to limit movement of the attachment member in at least the second direction along the longitudinal axis of the bearing housing.

14. The interface apparatus of claim 8, wherein the attachment member rotates relative to the barrel bearing.

15. The interface apparatus of claim 8, wherein the barrel bearing is configured to provide at least one degree of freedom pivoting movement of the attachment member relative to the bearing housing.

16. A method comprising:
   reacting loads, from an attachment member to a structure, in at least a first direction with a load bearing member coupled to the structure where the attachment member is coupled to the load bearing member;
   constraining a barrel bearing in a bearing housing of the load bearing member in at least the first direction, the barrel bearing having a cylindrical body that extends along a longitudinal axis of the load bearing member;
   simultaneously providing free movement of the attachment member, with the load bearing member, in at least a second direction; and guiding, with an aperture of the barrel bearing, linear movement of the attachment member relative to the barrel bearing.

17. The method of claim 16, wherein the load bearing member has the longitudinal axis and a lateral axis, the method further comprising reacting loads, with the load bearing member, from the attachment member to the structure, along at least the lateral axis.

18. The method of claim 17, further comprising providing, with the load bearing member, free pivoting movement of the attachment member about the longitudinal axis.

19. The method of claim 16, wherein the bearing housing is coupled to a baseplate and the baseplate is coupled to the structure, the method further comprising:
   providing free movement of the barrel bearing in at least the second direction, where the attachment member is coupled to the barrel bearing.

20. The method of claim 19, wherein the load bearing member has the longitudinal axis and a lateral axis, the method further comprising reacting loads, with the load bearing member, from the attachment member to the structure, along at least the lateral axis.

* * * * *